United States Patent [19]

Takematsu

[11] 4,415,247
[45] Nov. 15, 1983

[54] ELECTRIC FLASH APPARATUS

[75] Inventor: Yoshiyuki Takematsu, Tokyo, Japan

[73] Assignee: Fuji Koeki Corporation, Tokyo, Japan

[21] Appl. No.: 285,958

[22] Filed: Jul. 23, 1981

[30] Foreign Application Priority Data

Jul. 24, 1980 [JP] Japan .................. 55-101641

[51] Int. Cl.³ .............................................. G03B 7/16
[52] U.S. Cl. ..................................... 354/33; 354/132; 315/151
[58] Field of Search .................. 354/33, 132; 315/151, 315/241 P

[56] References Cited

U.S. PATENT DOCUMENTS

| | | | |
|---|---|---|---|
| 3,980,923 | 9/1976 | Schneider | 354/132 |
| 4,242,616 | 12/1980 | Takematsu | 354/132 |
| 4,337,416 | 6/1982 | Takematsu | 315/151 |
| 4,354,141 | 10/1982 | Takematsu | 354/132 |
| 4,360,764 | 11/1982 | Yagi | 315/151 |

Primary Examiner—Russell E. Adams
Attorney, Agent, or Firm—Fleit, Jacobson, Cohn & Price

[57] ABSTRACT

The invention provides an electric flash apparatus comprising a first flash unit incorporated into a camera, a second flash unit mounted detachably and outwardly on said camera, light quantity control means for controlling flash light of said first and second flash unit, flash timing control means for controlling flash lights of said first and second flash unit and a flash driving circuit commonly used to said first and second flash units. The flash driving circuit can activate the flash operations of at one of said flash units, both of said first flash unit and said second flash unit.

18 Claims, 6 Drawing Figures

ELECTRIC FLASH APPARATUS

The present invention relates to an electric flash apparatus and, more particularly to an electric flash apparatus for use of an optical apparatus such as a photographic device.

In recent years, a camera incorporating a flash unit has been widely employed. The camera in which the flash unit is incorporated can, however, flash photographing in only near distance due to the lack of light quantity, because the camera can not be made so large and the flash light quantity of the incorporated flash unit is relatively small. Accordingly, the under exposure is inevitable in case of photographing in the long distance which is longer than the predetermined distance. In such devices, a flash tube is provided in order to illuminate the object to be photographed, but the arrangement is designed such that the light from the flash tube will illuminate only the object, if the surface of the object is contoured the illumination of the surface is uneven. Furthermore, when the flashlight from the photoflash is employed as direct illumination for photographic object in a room or a photostudio, a shadow of the photographic object is commonly formed behind, producing poor photographic results.

In order to alleviate these disadvantages of photoflash device, it is known to use reflected, or bounced light to illuminate the object, there are still problems, however, in that the quantity of light incident on the photographic object is much reduced from the predetermined value to which the device is set, particularly when a reflecting surface is not white and in that an object having an uneven surface cannot be photographed so well, because a significant portion of the light reflected from the object is not incident on a film in the camera.

SUMMARY OF THE INVENTION

An object of the present invention is to provide an electric flash apparatus which performs good flashing operations.

Further object of the invention is to provide an electric flash apparatus which is reliable and which is inexpensive and economical.

Other objects and features will be in part apparent and in part pointed out hereinafter.

According to the present invention, an electric flash apparatus comprising a first flash unit incorporated into a camera, a second flash unit mounted outwardly on a camera, light quantity control means for controlling a quantity of light such that a light quantity of said first flash unit is less than that of said second flash unit, flash timing control means for controlling flash time durations of said first flash unit and said second flash unit such that the flash time duration of said first flash unit is approximately same as that of said second flash unit, and flash driving means for supplying driving signals to said first flash unit and said second flash unit, said first flash unit comprising first electrical energy storing means for charging an electrical energy to a first main storage capacitor, a first flash tube circuit including a first flash tube and a first trigger signal generating circuit for making said first main storage capacitor supply the electrical energy to said first flash tube of the first flash tube circuit, and said second flash unit comprising second electrical energy storing means for changing an electrical energy to a second main storage capacitor, a second flash tube circuit including a second flash tube and a second trigger signal generating circuit for making said second main storage capacitor supply the electrical energy to said second flash tube of the second flash tube circuit.

BRIEF DESCRIPTION OF THE DRAWINGS

Embodiments of the invention will now be described by way of examples with reference to the accompanying drawings, in which:

Referring to FIG. 1 of the drawings, there is shown, greatly simplified, an electric flash apparatus according to the present invention. The flash apparatus has a first flash unit 1 incorporated in a camera 3 and consisting of a first flash member 1a, and a second flash unit 2 consisting of a second flash member 2a. The first flash unit 1 further includes a first light receiving member 1b for sensing a light. The second flash unit 2 is accommodated in a flash housing, generally designated by numeral 4 and consisting of a first casing 4a which is detachably mounted on a camera body and a second casing 4b pivotably connected to the first casing 4a by means of a pivotable connecting member 4c. Accordingly, the second casing 4b is rotatable as is shown by an arrow 5 with respect to the first casing 4a. The first casing 4a is equipped with a light receiving member 2b and, recessed in a front surface thereof, a first flash member 1a which includes a first flash tube. The second casing 4b is equipped with a second flash member 1b which includes a second flash tube. Accommodated in the camera 3 is a first flash control circuit arrangement which is constructed as shown in FIG. 2. A second flash control circuit arrangement is accommodated in the housing 4 and is constructed as shown in FIG. 2.

Figure 1:
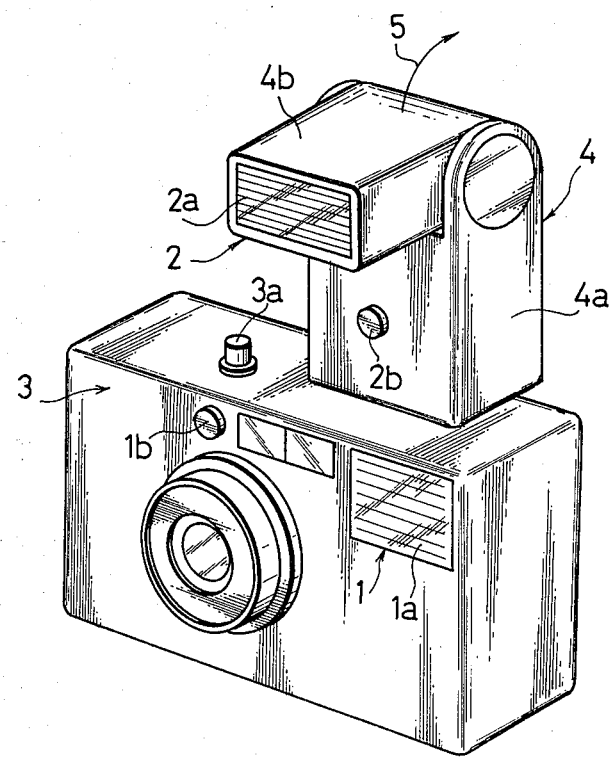
FIG. 1 is a perspective view of a camera having an electric flash apparatus according to the present invention.

The first flash control circuit arrangement FC-1 comprises a first direct current power source circuit $A_1$, a first voltage converter circuit $B_1$ for converting and boosting a direct current voltage from the direct current power source circuit $A_1$ to an alternating current voltage, a first rectifier circuit $C_1$ for rectifying the alternating current voltage from the voltage converter circuit $B_1$, a first electric charge storing circuit $D_1$ for supplying the electrical energy to the flash tube, a trigger pulse generating means for triggering a flash tube circuit member, a first switching circuit $G_1$ for actuating the flash tube circuit member, a first quenching circuit $H_1$ for controlling the first switching circuit $G_1$, a first flash quench controlling circuit $I_1$ for controlling the first quenching circuit $H_1$, a first light receiving circuit $J_1$, and a flash driving circuit K for actuating the first trigger pulse generating circuit $E_1$.

The power source circuit $A_1$ includes a battery 11 and a first power source switch 12 serially connected to the battery 11. The first voltage converter circuit $B_1$ comprises, substantially, a first oscillator circuit $OC_1$ and a biassing circuit which includes an oscillating resistor 13 and an oscillating capacitor 16. In more detail, the first voltage converter circuit $B_1$ includes the resistor 13 of which one terminal is directly connected to a negative terminal of the battery 11, the capacitor 16 of which one terminal is connected to other terminal of the resistor 13 to form the biassing circuit, an oscillating transformer 15, and an oscillating switch element in the form of a high performance silicon transistor 14.

The first oscillating transformer 15 having a primary winding 15a and a secondary winding 15b. One end of the primary winding 15a is directly connected to the negative terminal of the battery 11, and other end of the primary winding 15a is connected to a collector electrode of the transistor 14 in order to form the oscillating circuit $OC_1$. One end of the secondary winding 15b is connected to a base electrode of the transistor 14.

The first rectifier circuit $C_1$ includes an electric valve in the form of a diode 17 of which an anode electrode is connected to the secondary winding 15b of the transformer 15. The first electric charge storing circuit $D_1$ comprises a first main storage capacitor 18, a current-restricting resistor 19 and an indicating lamp in the form of a neon glow lamp 20 which is connected to the first main storage capacitor 18 in parallel by way of the current-restricting resistor 19. One terminal of the main storage capacitor 18 is connected to the cathode electrode of the diode 17, and other terminal of the main storage capacitor 18 is connected to an emitter electrode of the transistor 14 and to the positive terminal of the battery 11.

The first trigger pulse generating circuit $E_1$ comprises a first triggering capacitor 23 and a first triggering transformer 24 having a primary winding 24a and a secondary winding 24b. The first triggering capacitor 23 is connected between a juncture of the current-restricting resistor 19 and the neon glow lamp 20 and the primary winding 24a of the first triggering transformer 24 by way of a protecting resistor 21. The first flash tube circuit $F_1$ includes a first flash tube 25 having a pair of main current electrodes 25a and 25b and a trigger electrode 25c which is adjacent but external to the flash tube 25. The trigger electrode 25c is connected to one terminal of the secondary winding 24b of the first triggering transformer 24, one main current conducting electrode 25a is connected to the terminal of the first main storage capacitor 18 of the first electric charge storing circuit $D_1$.

The first switching circuit $G_1$ has a switching element in the form of a thyristor 27 and a commutation capacitor 28 connected to an anode electrode of the thyristor 27, a commutation resistor 26 connected in parallel to the thyristor 27, a gate resistor 29 and a gating capacitor 30.

The first quenching circuit $H_1$ comprises a protecting resistor 31 connected in parallel to the first flash tube 25 and a quenching switch element in the form of a quenching thyristor 32 connected in parallel to the thyristor 27 by way of the commutation capacitor 28.

Figure 3:
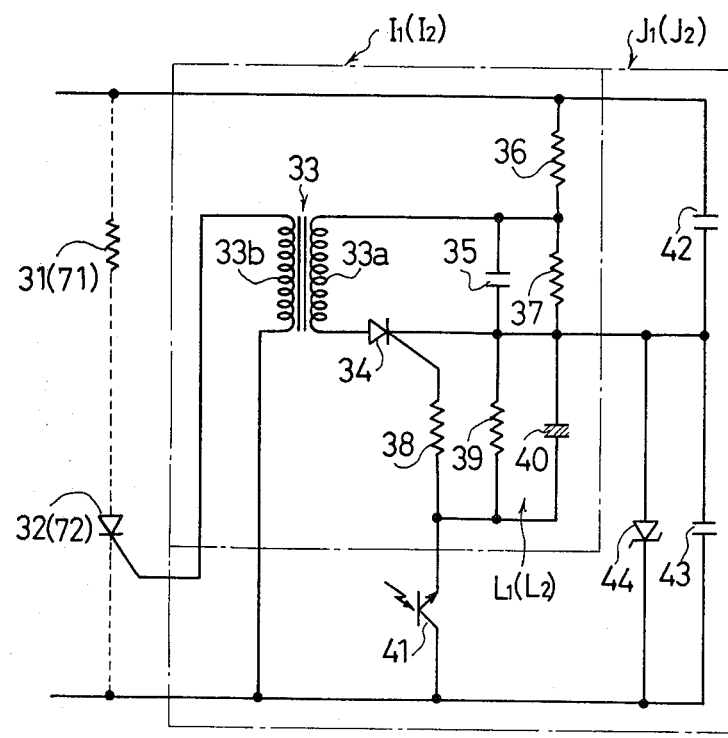
FIG. 3 is a detailed circuit diagram of a part of the electric flash apparatus of FIG. 2.

As is shown in FIG. 3, the first quench controlling circuit $I_1$ comprises a quenching transformer 33 having a primary winding 33a and a secondary winding 33b, a thyristor 34 connected to the first winding 33a of the quenching transformer 33, a capacitor 35 connected in parallel to the primary winding 33a of the quenching transformer 33 by way of the thyristor 34, resistors 36 and 37, a gate resistor 38 and an integration circuit $L_1$ having parallel connected integration resistor 39 and integration capacitor 40.

The first light receiving circuit $J_1$ comprises a light receiving element in the form of a phototransistor 41 connected to a gate electrode of the thyristor 34 and the integration circuit $L_1$, a constant voltage generating circuit having a capacitors 42 and 43 and a constant voltage generating element in the form of a Zener diode 44 and connected as shown.

Figure 2:
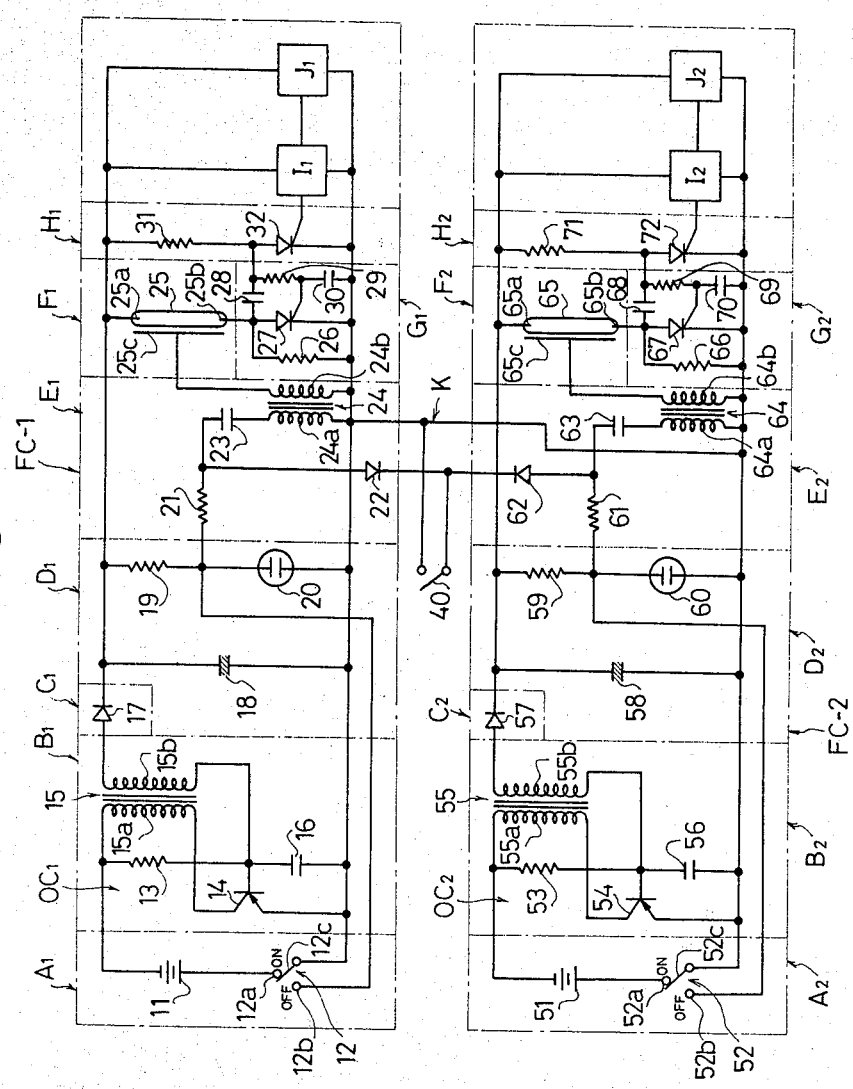
FIG. 2 is a detailed circuit diagram of a flash control circuit arrangement of an electric flash apparatus according to the present invention.

The second flash unit 2 has a second flash control circuit arrangement FC-2 which is accommodated in the flash housing 4. As is best shown in FIG. 2, the second flash circuit arrangement of the second flash unit 2 is constructed similarly to the first flash control circuit arrangement FC-1 of the first flash unit 1.

In more detail, the second flash control circuit arrangement FC-2 comprises a second power source circuit $A_2$, a second voltage converter circuit $B_2$ for converting and boosting a direct current voltage from the direct current power source circuit $A_2$ to an alternating current voltage, a second rectifier circuit $C_2$ for rectifying the alternating current voltage from the voltage converter circuit $B_2$, a second electric charge storing circuit $D_2$ for supplying the electrical energy to a second flash tube, a second trigger pulse generating circuit $E_2$ for triggering the second flash tube circuit member, a second switching circuit $G_2$ for actuating the second flash tube circuit member, a second quenching circuit $H_2$ for controlling the second switching circuit $G_2$, a second quench controlling circuit $I_2$ for controlling the second quenching circuit $H_2$, a second light receiving circuit $J_2$, and a driving circuit K which is commonly used together with the first flash control circuit arrangement FC-1.

In more detail, the power source circuit $A_2$ includes a battery 51 and a power source switch 52 serially connected to the battery 51 and having a stationary contact 52a connected to the battery 11, a stationary contact 52b and a movable contact 52c. The voltage converter circuit $B_2$ comprises a second oscillator circuit $OC_2$ and a biassing circuit which includes an oscillating resistor 53 and an oscillating capacitor 56. The second voltage converter circuit $B_2$ includes the resistor 53 of which one terminal is directly connected to a negative terminal of the battery 51, the capacitor 56 of which one terminal is connected to other terminal of the resistor 53 to form the biassing circuit, a second oscillating transformer 55, and a switch element in the form of a high performance silicon transistor 54. The oscillating transformer 55 consists of a primary winding 55a and a secondary winding 55b. One end terminal of the primary winding 55a is directly connected to the negative terminal of the battery 51, and other end terminal of the primary winding 55a is connected to a collector electrode of the transistor 54 in order to form the oscillator circuit $OC_2$. One end terminal of the secondary winding 55b is connected to a base electrode of the transistor 54.

The second rectifier circuit $C_2$ includes an electric valve in the form of a diode 57 of which an anode electrode is connected to the winding start terminal of the secondary winding 55b of the oscillating transformer 55. The second electric charge storing circuit $D_2$ comprises a second main storage capacitor 58, a current-restricting resistor 59 and a second indicating lamp in the form of a neon glow lamp 60 which is connected to the second main storage capacitor 58 in parallel by way of the current-restricting resistor 59. One terminal of the second main storage capacitor 58 is connected to a cathode electrode of the diode 57, and other terminal of the second main storage capacitor 58 is connected to an emitter electrode of the transistor 54 and to a positive terminal of the battery by way of the movable contact 52c and the stationary contact 52a of the power source switch 52.

The second trigger pulse generating circuit $E_2$ comprises a second triggering capacitor 63 and a second triggering transformer 64 having a primary winding 64a and a secondary winding 64b. The second triggering capacitor 63 is connected between a juncture of the current-restricting resistor 59 and the neon glow lamp 60 and the primary winding 64a of the first triggering transformer 64 by way of a protecting resistor 61. The second flash tube circuit $F_2$ includes a second flash tube 65 having a pair of main current electrodes 65a and 65b and a trigger electrode 65c which is adjacent but external to the flash tube 65. The trigger electrode 65c is connected to one terminal of the secondary winding 64b of the second triggering transformer 64, and one main current conducting electrode 65a is connected to the terminal of the second main storage capacitor 58 of the second electric charge storing circuit $D_2$.

The second switching circuit $G_2$ has a switching element in the form of a thyristor 67 and a commutation capacitor 68 connected to an anode electrode of the thyristor 67, a commutation resistor 66 connected in parallel to the thyristor 67, a gate resistor 69 and a gating capacitor 70. The second quenching circuit $H_2$ includes a protecting resistor 71 connected to the second flash tube 65 and a quenching switch element in the form of a quenching thyristor 72 connected in parallel to the thyristor 67 of the second switching circuit $G_2$ by way of the commutation capacitor 68. The second quench controlling circuit $I_2$ is constructured similarly to the first quench controlling circuit $I_1$ of the first flash control circuit arrangement FC-1, and the second light receiving circuit $J_2$ is also constructured similarly to that of the first flash control circuit arrangement FC-1, as is shown in FIG. 3.

According to the flash apparatus shown in FIG. 2, there are certain criteria, in the flash control circuit arrangements, that must be met in both of the first flash tube 25 and the second flash tube 65. To operate effectively, the current to be supplied to the first flash tube 25 must be relatively small compared with that to be supplied to the second flash tube 55, in order to make the quantity of the flash light generated by the first flash tube 25 to be smaller than that of the flash light from the second flash tube 65. To ensure this the first flash tube 25 of the first flash tube circuit $E_1$ must have a relatively low impedance compared with the second flash tube 65 of the second flash tube circuit $E_2$. To provide such low impedance, the first flash tube 25 should have a low gas pressure and a small electrode spacing in comparison with the second flash tube 58. That is to say, length and diameter of the second flash tube 65 is set to be larger than that of the first flash tube 25 such that the light quantity of the second flash tube 65 becomes greater than that of the first flash tube 25. Capacity of the second main storage capacitor 58 of the second electric charge storing circuit $D_2$ is set to be larger than that of the first main storage capacitor 18 of the first electric charge storing circuit $D_1$, since the light quantity of the second flash tube 65 is greater than that of the first flash tube 25. Moreover, an internal resistance value of the first flash tube 25 is adjusted and set to be larger in comparison with a conventional flash tube in order to make the flash durations of the first and the second flash tubes 25 and 65 same or approximately same, because the flash light duration becomes long in case the internal resistance value is large. In this case, the term of "approximately same" includes meaning of an optical approximate value. Furthermore, according to the present invention, the inner impedance of the first flash tube 25 is set to be smaller than that of the second flash tube 65 and an impedance element such as a resistor or a choked coil can be connected in series with the first flash tube 25. In this case, the impedance element serves as a current-limiting element for restricting a flash current which flows in the first flash tube 25. The current to be supplied to the first flash tube 25 must be relatively small compared with that to be supplied to the second flash tube 65 in order to make the quantity of the flash light generated by the first flash tube 25 smaller than that of the flash light from the second flash tube 65. However, when the first flash tube 25 has the low impedance compared with the second flash tube 65, the initiation of flashing of the first flash tube 25 tends to occur earlier than that of the second flash tube 65, the impedance element is connected to the first flash tube 25 in order to remove the above mentioned problems.

The electric flash apparatus constructed as foregoing description operates as follows.

When the power source switch 11 is made ON, namely, when the movable contact 12c is connected to the stationary contact 12a of the first power source switch 11, the first voltage converter circuit $B_1$ activates an oscillating operation, and thereby the high voltage is induced at the secondary winding 15b of the oscillating transformer 15. The boosted alternating current voltage is rectified by the first rectifier circuit $C_1$, and thereafter an electric charge is stored on the first main storage capacitor 18. In this case, the electric charge is also accumulated on the capacitors 23, 28 and 30. When the first main storage capacitor 18 is charged to a predetermined voltage, the neon glow lamp 20 lights indicating that the device is readiness for the flash tube 25 to be fired.

On the other hand, when the second power source switch 52 is made ON, namely when the movable contact 52c is connected to the stationary contact 52a of the second power source switch 52, the second voltage converter $B_2$ activates an oscillating operation, and thereby the high voltage is induced at secondary winding 55b of the oscillating transformer 55. The boosted alternating current voltage is rectified by the second rectifier circuit $C_2$ and thereafter an electric charge is stored on the second main storage capacitor 58. Simultaneously, the electric charge is also accumulated on the second triggering capacitor 63 and capacitors 68 and 70. When the second main storage capacitor 58 is charged to a predetermined voltage, the neon glow lamp 60 lights indicating that the device is readiness for flash tube 65 to be fired. In such conditions, the operation of the flash tube circuits are initiated by the flash driving circuit K. Namely, when the synchronous switch 40 of the flash driving circuit K is made ON in synchronizing with the camera shutter opening operation, enabling the flash tubes to be fired. When the switch 40 is closed, the electric charge of the triggering capacitor 23 is discharged through the switch 40 and the diode 22 of the flash driving circuit K and the primary winding 24a of the first triggering transformer 24. By discharge of the capacitor 23, triggering pulses are generated from the secondary winding 24b of the first triggering signal generating circuit $E_1$. The stored voltage on the first main capacitor 18 appears across the main current electrodes 25a and 25b of the first flash tube 25. The triggering pulse generated from the secondary winding 24b is applied to the trigger electrode 25c of the first flash tube 25, and thereby the first flash tube 25 is triggered to flash. At the same time, the electric charge of the second triggering capacitor 63 of the second flash control circuit arrangement FC-2 is discharged through the diode 62, the synchronous switch 40 of the flash driving circuit K and the primary winding 64a of the second triggering transformer 64. By the discharge of the second triggering capacitor 63, triggering pulses are generated from the secondary winding 64b of the second triggering transformer 64 of the second trigger pulse generating circuit $E_2$. The stored voltage on the second main capacitor 58 appears across the main current electrode 65a and 65b of the second flash tube 65. The triggering pulse generated from the secondary winding 64b is applied to the trigger electrode 65c of the second flash tube 65, and the second flash tube 65 is fired. In this case, the thyristor 27 of the first switching circuit $G_1$ and the thyristor 67 of the second switching circuit $G_2$ are triggered by charging voltages of the gating capacitors 30 and 70 to be conductive. Accordingly, the first flash tube 25 and the second flash tube 65 are triggered to be fired, the electric charge of the first main capacitor 18 is supplied to the first flash tube 25 as a discharging current to flash the brilliant flash light, and, at the same time, the electric charge stored on the second main capacitor 58 is supplied to the second flash tube 65 as a discharging current to flash the brilliant flash light. Under normal operation, the flash continues until the main storage capacitors 18 and 58 have discharged through the tubes 25 and 65 to the point where the voltage will no longer support the flash across the flash tubes 25 and 65. That usually occurs after about several milliseconds.

The first light receiving circuit $J_1$ senses the resultant flash light from the flash tubes 25 and 65 and, at the same time, the second light receiving circuit $J_2$ senses the resultant flash light from the first and the second flash tubes 25 and 65, and the phototransistors 41, 41 become conductive. When the light sensing elements in the form of the phototransistors 41 of the first light receiving circuit $J_1$ and the second light receiving circuit $J_2$ become conductive, the integration capacitors 40 and the integration resistors 39 of the first and the second quench controlling circuits $I_1$ and $I_2$ integrate the currents supplied through the phototransistors 41 of the first and the second light receiving circuits $J_1$ and $J_2$ and the thyristors 34 of the quench controlling circuits $I_1$ and $I_2$ are triggered to be conductive. When the thyristors 41 become conductive, electric charges stored on the capacitors 35 of the quench controlling circuits $I_1$ and $I_2$ are discharged through the primary windings 33a of the quenching transformers 33 and high voltage pulses are induced at the secondary windings 33b. By the voltage pulses from the secondary, windings 33b, the quenching thyristor 32 of the first quenching circuit $H_1$ and the quenching thyristor 72 are simultaneously triggered to become conductive.

When the quenching thyristor 32 of the first quenching circuit $H_1$ becomes conductive, the discharging current to be supplied to the first flash tube 25 is bypassed by the thyristor 32 and, at the same time, electric charge stored on the commutation capacitor 28 discharges through the thyristor 32 and the commutation resistor 26, thereby to produce across the resistor 46 a voltage, such that the polarity at the cathode side of the thyristor 27, is made positive after a time interval dependent upon a time constant determined by the commutation capacitor 28 and the resistor 26 causes the thyristor 27 to turn off. When the thyristor 27 of the first switching circuit $G_1$ becomes non-conductive, the first flash tube 25 of the first flash tube circuit $F_1$ is instantaneously extinguished. By the conduction of the thyristor 72 of the second quenching circuit $G_2$, the second flash tube 65 of the second flash tube circuit $F_2$ is instantaneously extinguished by the same operations of the second quenching circuit $H_2$ and the second switching circuit $G_2$ as those of the first quenching circuit $H_1$ and the first switching circuit $G_1$. In this case, the flash time durations of the first flash tube 25 and the second flash tube 65 are same and/or approximately same, and the flash light quantity of the second flash tube 65 is greater than that of the first flash tube 25.

The electric flash apparatus of the present invention can be used to perform the bouncing flash photography in a room or a photo-studio. As is shown in FIG. 1, the flash housing 4 is mounted on a top of the camera 3. The first flash member 1a of the camera 3 is directed toward an object to be photographed, such as a man. The second casing 4b of the flash housing 4 is set at a suitable angular orientation with respect to the first casing 4a, and a second flash member 2a is directed toward a ceiling, in order to apply the bounced flash light to the object to be photographed. That is to say, flash light from the second flash member 2a is directed toward the surface of the ceiling. The flash light of the second flash member reflects at the surface of the ceiling and thereafter constitutes the bounce light. As mentioned earlier, the quantity of flash light generated by the second flash member 2a is set to be greater than the quantity of the flash light generated by the first flash member 1a by making the inner impedance of the second flash tube 65 to be higher than that of the first flash tube 25, as is best shown in FIGS. 4A and 4B.

Figure 4A:
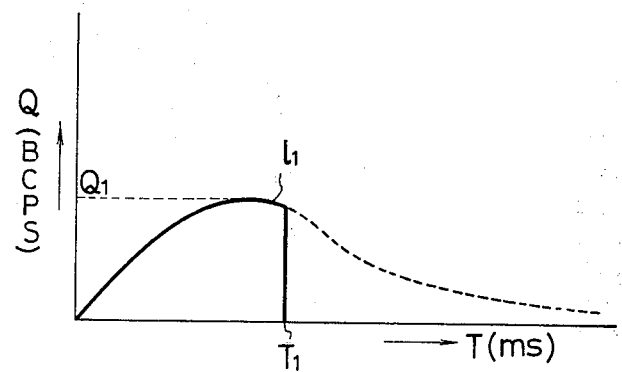
FIG. 4A is a graph showing the quantity of light produced from an electric flash apparatus according to the present invention as measured with respect to time.
Figure 4B:
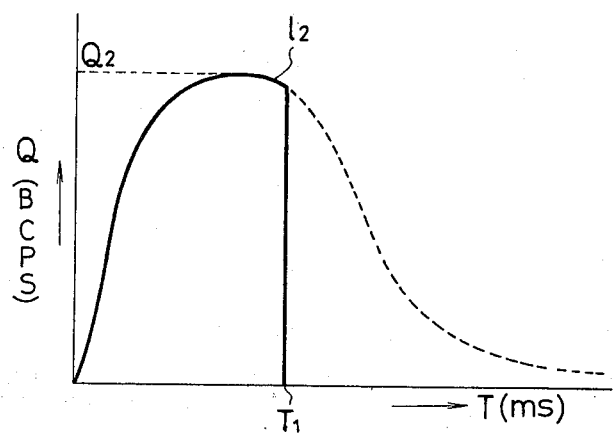
FIG. 4B is a graph showing the quantity of light produced from an electric flash apparatus according to the present invention as measured with respect to time.

FIGS. 4A and 4B show characteristics of flash light quantity Q as measured in term of Beam Candle Per Second (BCPS) with respect to Time T as measured in Millisecond (MS). In FIG. 4A, a curve $l_1$ shows the flash light characteristic of the first flash tube 25. As is shown by the curve $l_1$ of FIG. 4A, the maximum of the flash light quantity is $Q_1$ (BCPS) and the flash light of the first flash tube 25 is extinguished at the time $T_1$ (ms). FIG. 4B illustrates the flash light characteristic of the second flash tube 65. As is shown by a curve $l_2$, the maximum of the flash light quantity is $Q_2$ which is higher than $Q_1$ and the flash light duration of the second flash tube 65 is $T_1$ (ms). The time interval $T_1$ is preselected in synchronizing with the shutter operation of the camera 3. The flash durations of the flash tubes 25 and 65 are synchronized and set at the time $T_1$, and the flash tubes 25 and 65 are simultaneously and/or approximately same time extinguished at the time $T_1$ thereby to avoid unnecessary operation of the flash tubes 25 and 65. This permits the effective use of the first and second main storage capacitors of reduced rated capacity are made even though the apparatus is equipped with two flash tubes.

In addition to the above, the first flash unit 1 and the second flash unit 2 operate at a given diaphragm value such as F=4 by setting diaphragm values of automatic light exposure adjusting devices of the first flash unit 1 and the second flash unit 2 together with a diaphragm value of the camera-shutter (not shown in the drawings) such as F=4, because the first and the second flash light receiving circuits $J_1$ and $J_2$ are activated respectively, by the resultant value of the reflected light quantity of the first and the second flash tubes 25 and 65.

Additionally, only one of the first and the second flash tubes 25 and 65 can be activated by means of causing the first power source switch 12 or the second power source switch 52 OFF state, since the flash tubes 25 and 65 are blocked by the blocking diodes 22 and 62 of the flash driving circuit K. More specifically, the first flash tube circuit $E_1$ and the second flash tube circuit $E_2$ cease the flash operations so long as the first flash unit 1 incorporated into the camera 3 activates simultaneously with the second flash unit 2 mounted on an outer side of the camera 3, when the resultant flash light quantity of the reflecting lights which is reflected from the object to be photographed attains to the predetermined value. When the first power source switch 12 is ON state and, at the same time, the second power source switch 52 is OFF state, the diode 62 blocks the triggering current which flows to the second triggering transformer 64 from the triggering capacitor 23 and thereby the second flash tube circuit $E_2$ is not activated in spite of the ON operation of the synchronous switch 40. On the other hand, when the second power source switch 52 is ON state and, at the same time, the first power source switch 12 is OFF state, the first flash tube circuit $E_1$ is not activated, since the triggering current from the triggering capacitor 63 to the first trigger pulse generating circuit $E_1$ is blocked by the diode 22 of the flash driving circuit K in spite of the ON operation of the synchronous switch 40.

Figure 5:
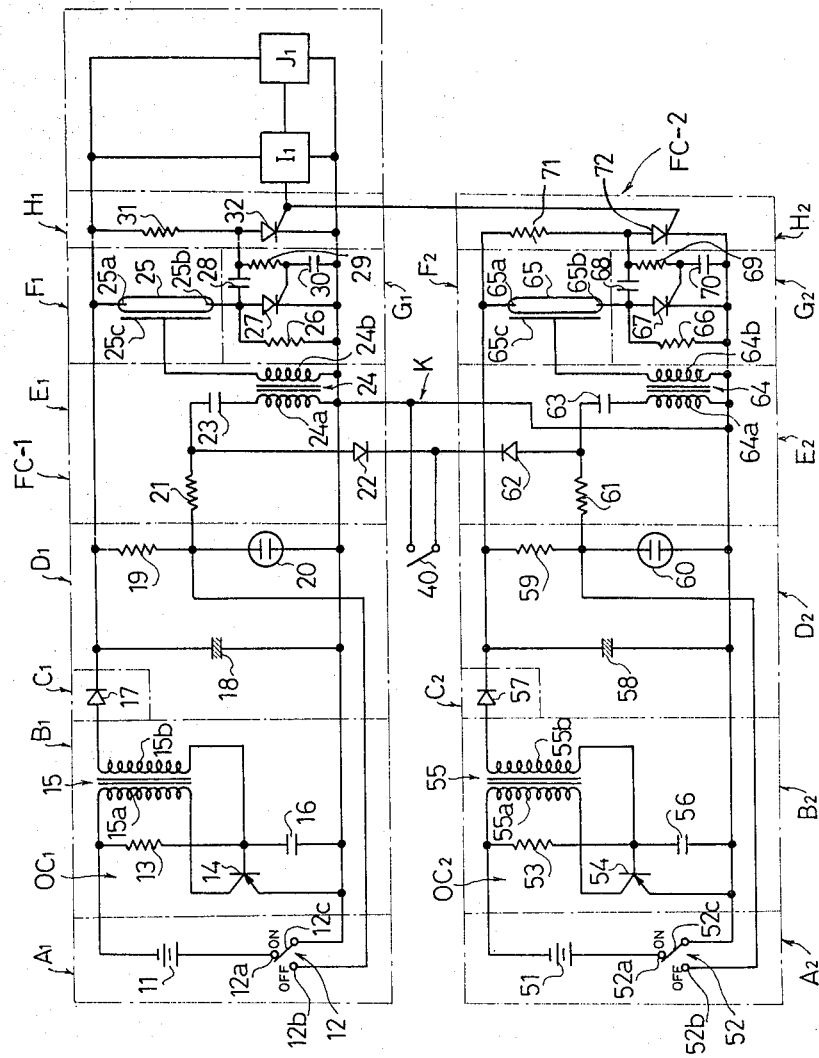
FIG. 5 is a detailed circuit diagram showing other electric flash apparatus according to the present invention.

FIG. 5 illustrates other embodiment of an electric flash apparatus of the present invention. The electric flash apparatus of this embodiment comprises, also, a first flash unit 1 incorporated in a camera 3 and a second flash unit 2 externally provided with respect to the camera 3. As is shown in FIG. 5, the first flash unit 1 has a first flash control circuit arrangement FC-1, and the second flash unit 2 has a second flash control circuit arrangement FC-2.

The first flash control circuit arrangement FC-1 comprises a first power source circuit $A_1$, a first voltage converter circuit $B_1$ for converting and boosting a direct current voltage from the direct current power source circuit $A_1$ to an alternating current voltage, a first rectifier circuit $C_1$ for rectifying the alternating current voltage from the first voltage converter circuit $B_1$, a first electric charge storing circuit $D_1$ for supplying the electrical energy to a flash tube, a first trigger pulse generating circuit $E_1$, a first switching circuit $G_1$ for actuating the first flash tube circuit $F_1$, a first quench controlling circuit $I_1$ for controlling the first quenching circuit $H_1$, a first light receiving circuit $J_1$, and a flash driving circuit K for actuating the first trigger pulse generating circuit $E_1$.

The second flash control circuit arrangement FC-2 of the second flash unit 2 comprises, also, a second power source circuit $A_2$, a second voltage converter circuit $B_2$ for converting and boosting a direct current voltage from the second direct current power source circuit $A_2$ to an alternating current voltage, a second rectifier circuit $C_2$ for rectifying the alternating current voltage from the second voltage converter circuit $B_2$ to a high D.C voltage, a second electric charge storing circuit $D_2$ for supplying the electrical energy to a second flash tube, a second trigger pulse generating circuit $E_2$ for triggering the second flash tube, a second switching circuit $G_2$ for actuating the second flash tube, and a second quenching circuit $H_2$ for controlling the second switching circuit $G_2$.

In the electric flash apparatus of FIG. 5, the second flash control circuit arrangement FC-2 is not provided with a light receiving circuit and a quench controlling circuit, and, therefore, each of the first light receiving circuit $I_1$, the first quench controlling circuit $J_1$ of the first flash control circuit arrangement FC-1 and the flash driving circuit K is commonly used to the second flash control arrangement FC-2. In more detail, an output side of the first light receiving circuit $I_1$ is commonly connected to a gate electrode of a thyristor 32 of the first quenching circuit $H_1$ and a gate electrode of a thyristor 72 of the second quenching circuit $H_2$. The flash driving circuit K is commonly connected to the first trigger pulse generating circuit $E_1$ of the first flash control circuit arrangement FC-1 and to the second pulse generating circuit $E_2$ of the second flash control circuit arrangement FC-2.

The electrical flash apparatus of FIG. 5 operates similar to the apparatus shown in FIG. 2, except the operations of the light receiving circuit and the quench controlling circuit. In more detail, when the first power source switch 12 is made ON state, the first voltage converter circuit $B_1$ operates and thereby a high alternating current voltage is produced from a secondary winding 15b of a first triggering transformer 15. The alternating current voltage from the first voltage converter circuit $B_1$ is rectified to a relatively high D.C voltage by the first rectifier circuit $C_1$. A main storage capacitor 18 is charged by the direct current voltage from the first rectifier circuit $C_1$ and, at the same time, other capacitors are also charged to a predetermined voltage. In the second flash control circuit arrangement FC-2, the similar operation can be carried out with that of the first flash control circuit arrangement FC-1. In such conditions, when a synchronous switch 40 of the flash driving circuit K is made ON in synchronism with a camera-shutter (not shown in the drawings), an electric charge stored on a first triggering capacitor 23 is discharged through a diode 22, the switch 40 and a primary winding 24a of the first triggering transformer 24, and a trigger pulse is produced at a secondary winding 24b of the first triggering transformer 24. Simultaneously, an electric charge stored on a second triggering capacitor 63 of the second trigger pulse generating circuit $E_2$ is discharged through a diode 62, the switch 40 and a primary winding 64a, and thereby a trigger pulse is produced at a secondary winding 64b of the second triggering transformer 64. By the trigger pulses, a first flash tube 25 and a second flash tube 65 are simultaneously triggered and is operated to produce brilliant flash lights.

The first light receiving circuit $J_1$ receives the resultant light of the first and the second flash tubes 25 and 65, and actuates the first quench controlling circuit $I_1$. The first quench controlling circuit $I_1$ applies the quench controlling signals to the first quenching circuit $H_1$ and the second quenching circuit $H_2$ after a predetermined time interval from the commencement of the flash operations of the first and the second flash tubes 25 and 65. By the activations of the first quenching circuit $H_1$ and the second quenching circuit $H_2$, the first switching circuit $G_1$ and the second switching circuit $G_2$ operate to stop the flash operation.

In accordance with the electric flash apparatus, circuit construction is very simplified and the accurate flashing operation can be performed, since the light receiving circuit and the quench controlling circuit are commonly used in both of the first flash unit and the second flash unit.

As is apparent from the foregoing description, the electric flash apparatus disclosed herein has following advantages.

An advantage over the prior art flash apparatus is that the invention provides a new electric flash apparatus of which light quantity can be increased, since the electric flash apparatus is comprised by a first flash unit incorporated into a camera and a second flash unit mounted detachably on the camera.

An advantage is that the invention provides a new electric flash apparatus which can perform long distance photography, providing any mechanical improvement to the conventional camera.

Further advantage is that the invention provides a new electric flash apparatus which can be made accurate in a distribution rate of the flash light quantity by providing respective main storage capacitor in each flash unit.

Still further advantage is that the apparatus of the invention can be used to perform the bounce-flash photography by setting the second flash unit at a desired angle with respect to the first flash unit.

Further advantage is that efficiency of the apparatus is improved, since a first and a second main storage capacitors are fully employed for flashing.

In view of the above, it will be seen that the several objects of the invention are achieved and other advantageous results are attained.

While preferred embodiments have been shown and described, it will be apparent to those skilled in the art that modifications can be made without departing from the principle and spirit of the invention, the scope of which is defined in the appended claims. Accordingly, the foregoing embodiments are to be considered illustrative, rather than restricting of the invention and those modifications which come within the meaning and range of equivalency of the claims to be included herein.

What is claimed is:

1. In an electric flash apparatus comprising a first flash unit incorporated in a housing of a camera, a second flash unit adapted to be mounted externally of said housing, light quantity control means for controlling respective quantities of light produced by said first and second flash units such that a light quantity of said first flash unit is less than the light quantity of said second flash unit, said first and second flash units including respective triggering and flash timing circuits for energizing said respective first and second flash units, and means for controlling the flash duration of the first and second flash units so that durations of respective flashes of said first and second flash units are approximately the same, said electric flash apparatus further including flash driving circuit means for supplying driving signals to said first and second triggering circuits, and flash operation selecting means for selecting and energizing one or both of said first and second flash units.

2. An electric flash apparatus as claimed in claim 1, wherein said first light quantity control means includes a first main storage capacitor and said second light quantity control means includes a second main storage capacitor that is larger than the capacitance of the first main storage capacitor.

3. An electric flash apparatus as claimed in claim 1, wherein said first and second flash units include respective flash tubes and said second flash tube is larger than the first flash tube.

4. An electric flash apparatus as claimed in claim 1, wherein said respective flash timing circuits include respective impedance elements connected in series with a respective flash tube and the impedance of said second flash tube is lower than the impedance of the first flash tube.

5. An electric flash apparatus as claimed in claim 1, wherein said respective triggering circuits are commonly connected to said first trigger signal generating circuit of said first flash unit and said second trigger signal generating circuit of said second flash unit.

6. An electric flash apparatus as claimed in claim 5, wherein said respective triggering circuits include a synchronous switch operated in synchronism with a shutter operation of a camera.

7. An electric flash apparatus as claimed in claim 6, wherein said first triggering circuit further includes blocking means for blocking the triggering signal supplied to the second triggering circuit.

8. An electric flash apparatus as claimed in claim 6, wherein said second triggering circuit further includes blocking means for blocking the triggering signal supplied to the first triggering circuit.

9. An electric flash apparatus as claimed in claim 7, wherein said blocking means includes a first diode connected between the synchronous switch and the second triggering circuit.

10. An electric flash apparatus as claimed in claim 8, wherein said blocking means includes a diode connected to said synchronous switch and said first triggering circuit.

11. An electric flash apparatus as claimed in claim 1, wherein at least one of said first flash unit and said second flash unit has a light receiving circuit activated by a resultant light quantity of said first flash tube and said second flash tube and a quench controlling circuit operated by a signal from said light receiving circuit for controlling flash stopping operation of said first flash tube and said second flash tube.

12. An electric flash apparatus as claimed in claim 11, wherein said first flash unit has a first light receiving circuit activated by a resultant light quantity of said first flash tube and said second flash tube and a first quench controlling circuit operated by a signal from said first light receiving circuit for controlling flash stopping operation of said first flash tub.

13. An electric flash apparatus as claimed in claim 11, wherein said second flash unit has a second light receiving circuit activated by a resultant light quantity of said first flash tube and said second flash tube and a second quench controlling circuit operated by a signal from said second light receiving circuit for controlling flash stopping operation of said second flash tube.

14. An electric flash apparatus as claimed in claim 11, wherein said first flash unit further comprises a first switching circuit for energizing said first flash tube and a first quenching circuit for extinguishing the first flash tube and actuated by a quench controlling signal from said first quench circuit, and said second flash unit further comprises a second switching circuit for activating said second flash tube and a second quenching circuit for extinguishing the second flash tube of said flash tube and actuated by a quench controlling signal from said second quench controlling circuit.

15. An electric flash apparatus as claimed in claim 5 wherein said first and the second triggering circuits have, respectively, a trigger capacitor and a triggering transformer having primary winding connected to said trigger capacitor and a secondary winding electrically connected to a trigger electrode of the flash tube.

16. An electric flash apparatus as claimed in claim 1, wherein each of said first and the second flash units further includes, respectively, a voltage converter circuit for converting a direct current voltage of a direct current voltage and a rectifier circuit for rectifying said alternating current voltage to a direct current voltage.

17. An electric flash apparatus as claimed in claim 11, wherein said second flash unit is pivotably arranged with respect to said first flash unit.

18. An electric flash apparatus as claimed in claim 16, wherein said direct current power source circuit comprises a battery and a power source switch having a stationary contact connected to said battery, a stationary contact connected to a triggering capacitor and a movable contact to said voltage converter circuit.

* * * * *